United States Patent
Gillis et al.

(10) Patent No.: US 6,917,496 B2
(45) Date of Patent: Jul. 12, 2005

(54) SPACER RING FOR DISK DRIVE SPINDLE WITH LOAD/UNLOAD FEATURE, LATCH FEATURE, AND TRIBOLOGICAL OVERCOAT

(75) Inventors: Donald Ray Gillis, San Jose, CA (US); Mike Suk, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 470 days.

(21) Appl. No.: 09/946,036

(22) Filed: Sep. 4, 2001

(65) Prior Publication Data

US 2003/0043509 A1 Mar. 6, 2003

(51) Int. Cl.$^7$ ............................................. G11B 21/22
(52) U.S. Cl. ...................................................... 360/254.2
(58) Field of Search .......................... 360/254.2, 254.8, 360/256.2, 97.02, 256.4, 256.3

(56) References Cited

U.S. PATENT DOCUMENTS

| | | | |
|---|---|---|---|
| 4,903,157 A | | 2/1990 | Malek |
| 5,034,837 A | | 7/1991 | Schmitz |
| 5,363,261 A | | 11/1994 | Eckberg et al. |
| 5,377,065 A | | 12/1994 | Morehouse et al. |
| 5,543,986 A | | 8/1996 | Albrecht |
| 5,701,129 A | * | 12/1997 | Itou et al. ................... 343/873 |
| 5,724,208 A | | 3/1998 | Yahata |
| 5,734,527 A | * | 3/1998 | Reinhart ................... 360/256.2 |
| 5,760,999 A | | 6/1998 | Yahata |
| 6,147,841 A | | 11/2000 | Rao |
| 6,215,617 B1 | | 4/2001 | Okumura et al. |
| 6,292,333 B1 | * | 9/2001 | Blumentritt et al. ...... 360/254.8 |
| 6,501,624 B1 | * | 12/2002 | Gillis et al. ............... 360/256.3 |
| 6,535,359 B1 | * | 3/2003 | Boutaghou ................ 360/256.4 |
| 6,542,335 B1 | * | 4/2003 | Misso et al. ............. 360/256.2 |
| 6,618,221 B2 | * | 9/2003 | Gillis et al. ............... 360/97.02 |

FOREIGN PATENT DOCUMENTS

| | | |
|---|---|---|
| JP | 61148686 A | 7/1986 |
| JP | 2046582 A | 2/1990 |
| JP | 3259481 A | 11/1991 |
| JP | 4082066 A | 3/1992 |
| JP | 2000163905 A | 6/2000 |

* cited by examiner

Primary Examiner—Tianjie Chen
(74) Attorney, Agent, or Firm—Bracewell & Patterson, L.L.P.

(57) ABSTRACT

A hard disk drive utilizes a spacer ring at its inner diameter to load and unload the read/write heads. During relatively small shock events, the actuator is retained relative to the disk through a circumferential groove in the spacer ring. A complementary protrusion on the load/unload tab extends from the actuator into the groove to complete the retention. A tribological coating on the spacer ring and/or protrusion significantly reduces wear therebetween. However, during large shock events an inertial latch is used by the system to hold the actuator in place.

9 Claims, 2 Drawing Sheets

SPACER RING FOR DISK DRIVE SPINDLE WITH LOAD/UNLOAD FEATURE, LATCH FEATURE, AND TRIBOLOGICAL OVERCOAT

BACKGROUND OF THE INVENTION

1. Technical Field

The present invention relates in general to an improved hard disk drive, and in particular to an improved spacer ring for a disk drive having an inner diameter load/unload latching device.

2. Description of the Prior Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, two or three disks are stacked vertically on a common spindle that is turned by a disk drive motor at several thousand revolutions per minute (rpm).

The only other moving part within a typical HDD is the actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop directly over the desired track.

It is not uncommon for hard disk drives to experience some level of mechanical shock events. For this reason, prior art drives are commonly equipped with means for loading and unloading the read/write heads on the actuator with respect to the disks. The load/unload devices or ramps are typically located beyond the outer diameter of the disks in order to protect the surfaces of the heads and the disks. Although these designs are workable, an improved system and method for retaining the actuator and heads during shock events would be desirable.

SUMMARY OF THE INVENTION

One embodiment of a hard disk drive utilizes a spacer ring at its inner diameter to load and unload the read/write heads of the drive with respect to the disks. During relatively small shock events, the actuator is retained relative to the disk through a circumferential groove located in the spacer ring. A complementary protrusion on the load/unload tab extends from the actuator into the groove to complete the retention. A tribological coating on the spacer ring and/or protrusion significantly reduces wear and extends the life of their contacting portions. However, during large shock events an inertial latch is used by the system to hold the actuator in place.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above maybe had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT OF THE PRESENT INVENTION

Figure 1:
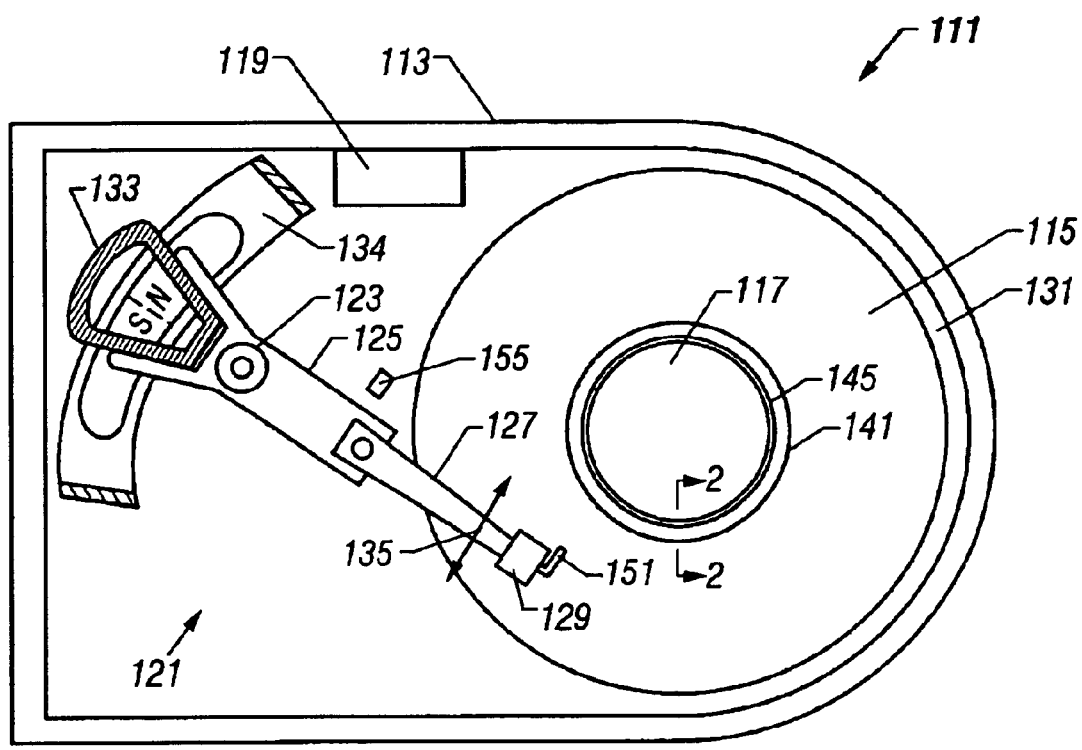
FIG. 1 is a plan view of one embodiment of a disk drive constructed in accordance with the present invention.

Referring to FIG. 1, a schematic drawing of one embodiment of an information storage system comprising a magnetic hard disk file or drive 111 for a computer system is shown. Drive 111 has an outer housing or base 113 containing a plurality of stacked, parallel magnetic disks 115 (one shown) which are closely spaced apart. Disks 115 are rotated by a spindle motor assembly 131 having a central drive hub 117. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disks 115.

In the embodiment shown, each arm 125 has extending from it at least one cantilevered load beams or suspensions 127, a magnetic read/write transducer or head 129 mounted on a slider secured to a flexure that is flexibly mounted to each suspension 127. The read/write heads 129 magnetically read data from and/or magnetically write data to disks 115. The level of integration called head gimbal assembly is head 129 and the slider are mounted on suspension 127. Suspensions 127 have a spring-like quality which biases or urges the slider against the disk to enable the creation of the air bearing film between the slider and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves head gimbal assemblies radially across tracks on the disks 115 until the heads 129 settle on the target tracks. The head gimbal assemblies operate in a conventional manner and always move in unison with one another, unless drive 111 uses multiple independent actuators (not shown) wherein the arms can move independently of one another.

Figure 2:
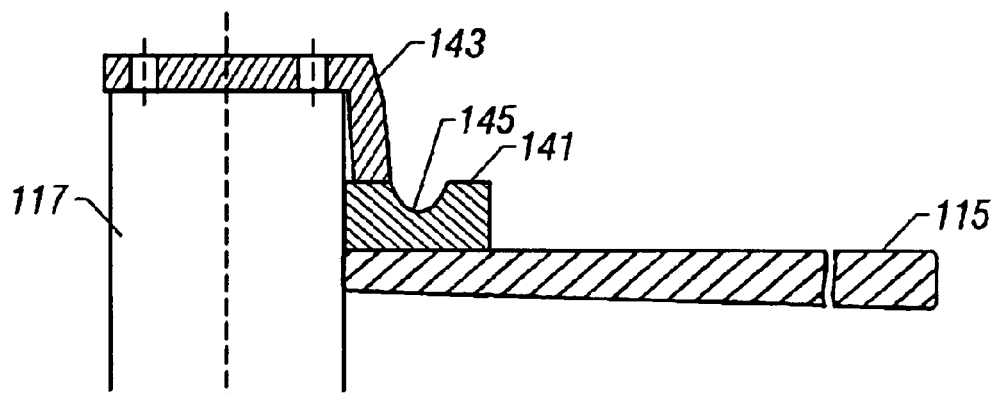
FIG. 2 is a sectional side view of a portion of the disk drive of FIG. 1 taken along the line 2—2 of FIG. 1.
Figure 4:
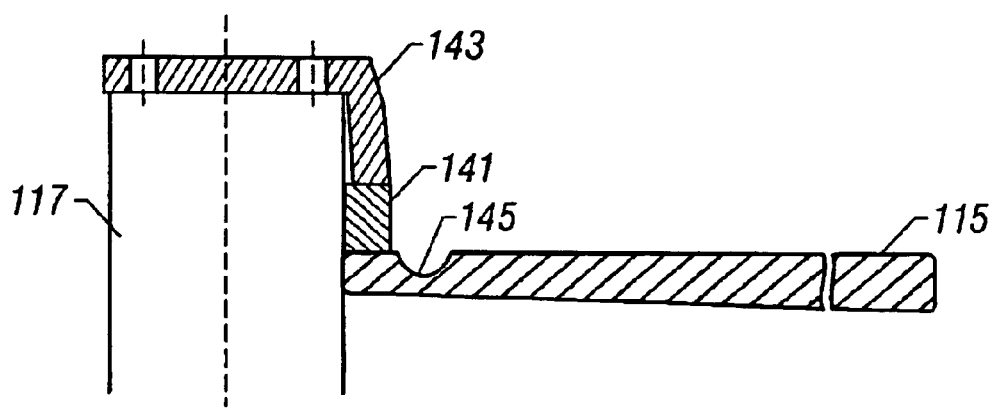
FIG. 4 is a sectional side view of an alternate embodiment of a disk drive constructed in accordance with the present invention.

Referring now to FIGS. 1 and 2, a spacer ring 141 is secured adjacent to the central drive hub 117 of the spindle motor at the inner diameter of disks 115 via a fastening mechanism 143, such as a clamp. Spacer ring 141 is a continuous flat annular member having a generally rectangular cross-sectional profile and is located on or adjacent to at least one surface of disk 115 as shown. A generally concave recess or groove 145 circumscribes the surface of spacer ring 141 and is preferably semi-circular in shape. Alternatively, groove 145 may be formed directly in disk 115 (see, e.g., FIG. 4). In addition, groove 145 is coated, sputtered, or plated, for example, with a tribological layer in order to reduce frictional contact therewith. Moreover, the entire surface of spacer ring 141 may be coated with the tribological layer. The tribological layer may comprise, for example, a hard coating such as carbon.

Figure 3:
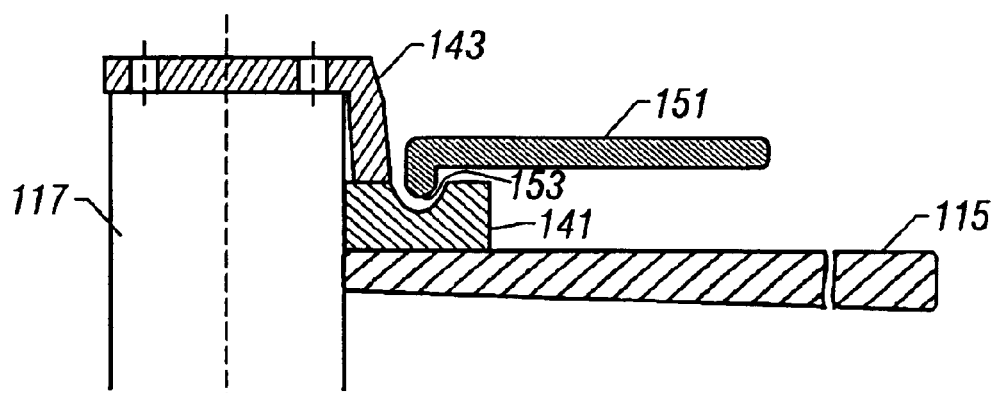
FIG. 3 is the sectional side view of FIG. 2 showing the actuator arm in an engaged position relative to the spacer ring.

As shown in FIGS. 1 and 3, a load/unload tab 151 extends from the distal end of actuator 121, opposite voice coil 133, beyond heads 129. Tab 151 is provided with a rib or protrusion 153 that is generally complementary in shape to the groove 145 in spacer ring 141. In operation, protrusion 153 is moved into and out of groove 145 to unload radially inward and load radially outward, respectively, heads 129 with respect to disks 115. Alternatively, protrusion 153 also maybe coated with the tribological layer previously mentioned. The tribological layer(s) reduce wear between the contacting parts (spacer ring 141 and groove 145, and protrusion 153) by a factor of ten or more, thereby significantly reducing debris generated by such contact. Thus, the heads 129 on actuator 121 are loaded onto disks 115 or "unlocked" in FIGS. 1 and 2, and unloaded off disks 115 and onto spacer ring 141 or "locked" in FIG. 3.

In environments wherein the disk drive 111 may experience more extreme mechanical shock, an inertial latching feature or latch 155 may be provided for selectively engaging actuator 121 at the locked position to better protect the components of disk drive 111. In addition, spacer ring 141 may be ferromagnetic and load/unload tab 151 may have a small magnet attached to it (at, for example, protrusion 153), or vice versa. This allows enhanced engagement between the two parts.

The present invention has several advantages. Although the invention has many applications, it is particularly well suited for protecting the heads and disks during routine and/or relatively low mechanical shock events in low cost disk drives having one or two disk surfaces. The read/write heads are loaded and unloaded at the spacer ring located at the inner diameter of the disks. The combination of the groove in the spacer ring and the protrusion on the actuator enhance the ability of the disk drive to retain the actuator arm over a simple frictionally-retained actuator.

While the invention has been shown or described in only some of its forms, it should be apparent to those skilled in the art that it is not so limited, but is susceptible to various changes without departing from the scope of the invention.

What is claimed is:

1. A disk drive, comprising:

a housing;

a spindle motor mounted to die housing;

a media storage disk mounted to the spindle motor for rotation, the disk having an inner diameter and an outer diameter;

a spacer ring mounted to the spindle motor adjacent to the inner diameter of the disk;

a groove formed in and circumscribing the spacer ring;

an actuator pivotally mounted to the housing for motion relative to the disk, and having a head for reading data from and writing data to the disk;

a tab extending from a distal end of the actuator and having a protrusion for engaging the groove when the actuator is in a locked position to prevent the head from loading with respect to the disk and thereby reduce damage to the head and the disk during shock events, and disengaging the groove when the actuator is in an unlocked position such that the head is permitted to load with respect to the disk; and wherein one of the spacer ring and the tab has a ferromagnetic material, and the other of the spacer ring and the tab has a magnet for engaging the ferromagnetic material.

2. The disk drive of claim 1 wherein the groove is generally semi-circular in shape and the protrusion is generally complementary in shape to the groove.

3. The disk drive of claim 1 wherein the spacer ring is coated with a tribological layer to reduce friction during contact with the protrusion.

4. The disk drive of claim 3 wherein the tribological layer comprises carbon.

5. The disk drive of claim 1 wherein the protrusion is coated with a tribological layer for reducing friction during contact with the groove.

6. The disk drive of claim 1, further comprising a latch for engaging the actuator in the locked position during extreme mechanical shock.

7. A method of reducing damage to a read/write head and a media storage disk during shock events to a disk drive, comprising:

(a) providing a disk drive with a media storage disk mounted to a spindle, a spacer ring with a groove adjacent to an inner diameter of the disk, and an actuator with a read/write head and a tab;

(b) providing one of the spacer ring and the tab with ferromagnetic material, and the other of the spacer ring and the tab with a magnet;

(c) rotating the disk and moving the actuator relative to the disk such that the head reads data from and writes data to the disk; and (d) moving the head toward the inner diameter of the disk such that the tab engages the groove and the magnet engages the ferromagnetic material to prevent the head from loading with respect to the disk.

8. The method of claim 7, further comprising the step of disengaging the groove with the tab such that the head is permitted to load radially outward with respect to the disk.

9. The method of claim 7, further comprising the step of coating the groove with a tribological layer to reduce friction during contact with the tab.

* * * * *